(12) United States Patent
Fenchel

(10) Patent No.: US 6,964,047 B2
(45) Date of Patent: Nov. 8, 2005

(54) METHOD AND APPARATUS FOR A FAST PROCESS MONITOR SUITABLE FOR A HIGH AVAILABILITY SYSTEM

(75) Inventor: Gary G. Fenchel, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 685 days.

(21) Appl. No.: 10/027,200

(22) Filed: Dec. 20, 2001

(65) Prior Publication Data

US 2003/0120713 A1 Jun. 26, 2003

(51) Int. Cl.[7] .................................................. G06F 9/00
(52) U.S. Cl. ........................... 718/102; 718/108; 714/1
(58) Field of Search ........................ 719/324; 709/221; 714/16, 1; 718/102, 108

(56) References Cited

U.S. PATENT DOCUMENTS 5,526,358 A * 6/1996 Gregerson et al. .......... 709/221
6,704,806 B1 * 3/2004 Decker ........................ 719/324
2002/0087916 A1 * 7/2002 Meth ............................ 714/16

* cited by examiner

Primary Examiner—Meng-Al T. An
Assistant Examiner—Qing-Yuan Wu

(57) ABSTRACT

An application initiates a parent process (102) to begin executing the application. The parent process (102) creates a child process (104) to execute the application. The parent monitors the death of the child process using inter-process communications (118). The child process monitors the parent process using polling (114, 116). If the parent process detects the death of the child, the parent process creates another child to continue the processing of the dead child. If the child process detects the death of the parent process (119), the child creates another child process (120) to execute the application it previously executed. The original child, now a parent, monitors the child process via inter-process communication (128). The new child monitors the parent using polling (124, 126)

18 Claims, 2 Drawing Sheets

METHOD AND APPARATUS FOR A FAST PROCESS MONITOR SUITABLE FOR A HIGH AVAILABILITY SYSTEM

FIELD OF THE INVENTION

The present invention relates generally to software process monitors, and in particular, to a method and apparatus for continuously monitoring software processes to provide high availability and reliability for applications.

BACKGROUND OF THE INVENTION

Fault-tolerant and high availability processing systems are known. These systems are used in applications requiring high reliability and low downtime. Exemplary applications for fault-tolerant or high availability systems include telecommunications applications, such as switching technology used in wire line and wireless switching applications. Fault-tolerant and high availability processing systems are typically required to have the ability to detect when a software process has died (abnormally stopped executing). Also, these systems must provide for some recovery from the death of a process.

Some existing fault-tolerant and high availability processing systems detect the death of a process by polling for process existence. Polling, however, has certain drawbacks including the time required to poll and the computation expense associated with polling. In certain real-time applications, such as real-time switching applications, the detection and recovery of process death must be on the order of milliseconds or less. Therefore, polling alone, particularly at the application level, is unacceptable in some cases.

Some operating systems provide protocols and facilities for monitoring processes. These operating system facilities often are more attractive than polling alone. UNIX and UNIX-like operating systems typically provide an asynchronous signal to be sent upon the death of another process. However, the asynchronous signal is only sent to a parent process for the death of an associated child process. The parent-child process relationship is created when the parent "forks" or creates a child process. Since the parent-child relationship is required in UNIX and UNIX-like operating systems for reception of the death of a child signal, a single independent monitor for many processes without the parent-child relationship cannot rely on this signal. Also, the UNIX and UNIX-like facilities for process monitoring do not notify a child process of the death of its parent. Therefore, while a parent process may fork a child process and rely on the death of child signal to monitor the child process, this facility does not allow a child process to monitor the parent because there is no "death of parent signal."

Therefore a need exists for a method and apparatus for improved process monitoring.

SUMMARY OF THE INVENTION

In accordance with the invention, a method is provided for monitoring a software process running on a processor. A first process runs on the processor to execute an application requiring process monitoring. The application is for example, a wireless switching application associated with wireless communications. The first process creates a second process to actually run the application on the processor. Preferably, the second process is a child process of the first process. The second process continues execution of the application and the first process stops execution of the application. Preferably the transition between the first process ending execution of the application and the second process beginning execution of the application is seamless. That is, the transition is not perceptible to a user of the application. Preferably, the first process monitors the continuous execution of the second process via a death of child signal from the operating system. The second process simultaneously monitors the first process to ensure that the first process continues to execute. Preferably, the second process polls the first process periodically to determine whether the first process is still executing. If the second process determines that the first process is dead, that is, no longer executing normally, then the second process creates a third process to execute the application. Preferably, the third process uses state information from the second process to seamlessly continue execution of the application. The second process ceases execution of the application but continues to monitor the third process, which is its child process, for a death of child signal. The third process simultaneously monitors the second process to ensure that the second process continues to execute. In other words, the third process monitors the second process to ensure that its monitor (the second process) continues to execute normally. The roles of the parent and child processes are generated and regenerated, as necessary, as described above, to ensure the application processes are monitored.

An apparatus for process monitoring includes the first process and second process as described above. In addition, and apparatus that stores software to execute and create the first, second and third processes as described above is provided.

BRIEF DESCRIPTION OF THE DRAWINGS

FIG. 1 is a schematic block diagram showing a first process running on a processor in accordance with the present invention;

FIG. 2 is a schematic block diagram showing the creation of a second process, which coordinates with the first process to provide process monitoring;

FIG. 3 is a schematic block diagrams showing the monitoring between the first processor and the second processor; and FIG. 4 is a schematic block diagram showing the actions taken by the second process to create a third process due to the death of the first process.

DETAILED DESCRIPTION OF THE PREFERRED EMBODIMENTS

Figure 1:
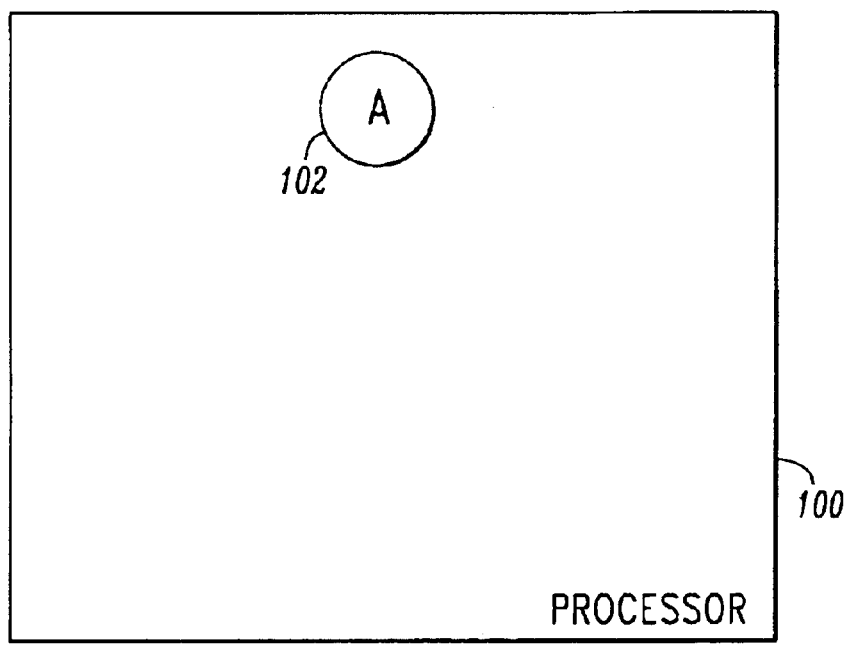
FIGS. 1–4 are schematic block diagrams showing the progressive execution of an application with process monitoring in accordance with the present invention. More specifically.

FIG. 1 is a schematic block diagram of a processor with a process monitor in accordance with the present invention. Processor 100 is preferably a high availability processor with memory and peripherals. Though shown as one block, processor 100 is alternatively one or multiple processors coupled together in any suitable manner. Many processor configurations are known for fault-tolerant and high availability processing and processor 100 may have any of these configurations or a combination thereof.

An application runs on processor 100. The application is preferably a wireless telecommunications application, a financial application or another application requiring reliability and high availability. The application is implemented, at least in part, by process A 102, which is running on processor 100. In the preferred embodiment, processor 100 runs the UNIX operating system and process A 102 is a UNIX process. Process A 102 is written to take advantage of the inter-process communication mechanisms provided by the UNIX operating system.

Figure 2:
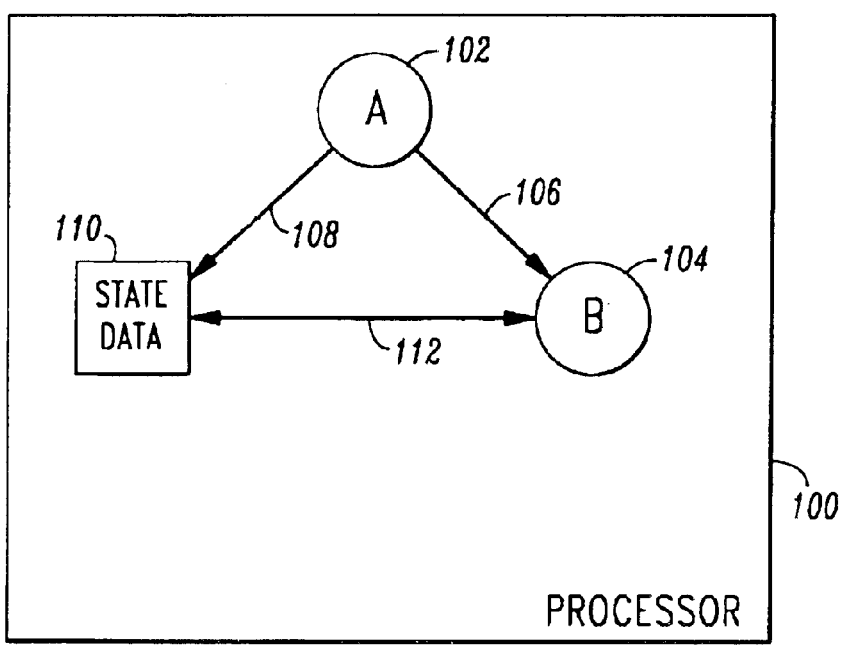

FIG. 1 shows the state of the processor 100 at initiation of the application by execution of process A 102. FIG. 2 shows the state of processor 100 shortly after the initiation of process A 102. As shown in FIG. 2, process A 102 creates a second process B 104. Preferably, process B 104 is created by a fork command executed by process A 102. The fork process is shown symbolically in FIG. 2 by the line 106. If necessary, process A 102 writes its state information to state data storage area 110. This operation is symbolized in FIG. 2 by the line 108.

Process B 104, is a child process of process A 102. Conversely, process A 102 is the parent process of process B 104. In the preferred embodiment, this parent-child relationship is created by virtue of the fork process used to create process B 104 using UNIX inter-process communication mechanisms. Since, process A 102 is the parent of process B 104, process A 102 monitors process B 104 to determine if that process dies or stops executing normally. Preferably, process A monitors process B by awaiting receipt of a death of child process signal from the operating system. Process A 102 is preferably programmed to take appropriate action in response to a death of child signal. Most preferably, if process A 102 receives a premature or abnormal death of child signal for process B 104, then process A 102 may create a new child process to take over the execution of the application executed by process B 104.

Preferably, process B does the actual processing associated with the application. That is, process A merely creates process B and process B 104 does the actual application processing. Process A then in effect becomes a monitor to insure proper operation of process B 104 and take corrective action if process B 104 dies.

Preferably process B 104 periodically writes state information associated with its processing in state data storage area 110. This permits another process to continue processing in the case where process B prematurely dies. Also, process B may obtain state information residing in state data storage area 110, for example, upon initiation by process A or to modify a previous transaction. The interactions with state data storage area 110 and process B 104 are symbolized in FIG. 2 as line 112.

Figure 3:
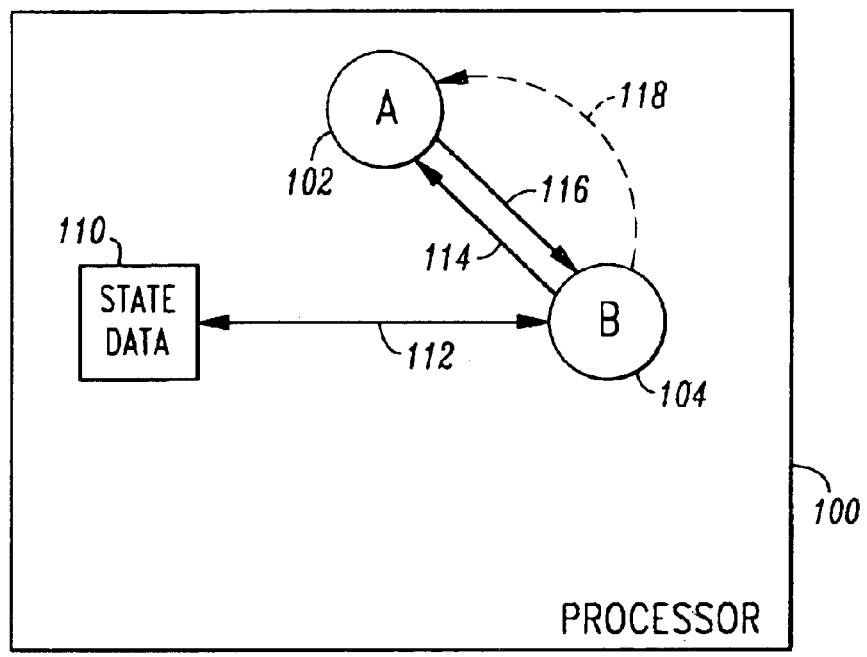

FIG. 3 shows additional interactions between process A 102 and process B 104 in accordance with the present invention. In particular, process B 104 monitors process A 102 to determine if process A is "alive" and executing. Preferably, process B 104 polls process A periodically to determine if process A has died. More specifically, process B periodically sends a request or message to process A 102, as symbolized in FIG. 3 by line 114. Process A 102, if it is working properly, responds with an answer or return message, as symbolized by line 116. The polling between process A 102 and process B 104 permits process B to monitor the status of its parent process, process A 102. As an alternative to polling, process B 104 may check the status of process A 102 by a process table look-up mechanism provided by the operating system. Process A 102 monitors process B 104 by virtue of the death of child signal provided by the operating system, as discussed above. This monitoring is shown symbolically in FIG. 3 by line 118.

Figure 4:
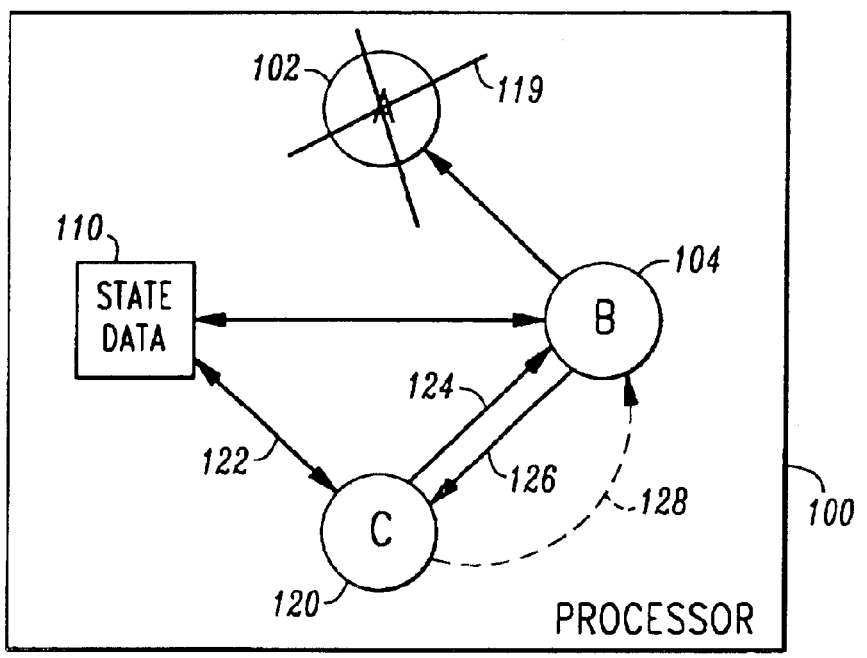

In accordance with the present invention, if process B 104 determines that its parent process is dead, then corrective action is taken. The corrective action is necessary at least because the parent process serves as the monitor for the child process. The corrective action taken is to create a new child process to run the application and have the existing child process (in this case process B) become a parent process and process monitor. FIG. 4 shows this corrective action in further detail.

As shown symbolically by "X" 119, if process A 102 dies, then process B 104 takes corrective action. Preferably, process B 104 creates a new child process, process C 120. Most preferably, process B 104 forks process C 120 to create the necessary parent-child relationship under the UNIX operating system. Process C 120 continues execution of the application previously executing as process B. Preferably, process C obtains state information from state storage area 110 to seamlessly continue execution of the application. This is symbolized by line 122. The execution is seamless in that users and higher-level applications relying on the application executed by process B are not affected by the transfer of control to process C 120. After process C 120 is successfully created, process B 104 stops execution and monitors process C via the death of child signal, as symbolized by line 128. Process C 120 preferably monitors process B 104 via a polling interface symbolized by line 124 and line 126.

Notably, after the creation of process C shown in FIG. 4, process B and process C 120 have a relationship synonymous with process A and process B, respectively, of FIG. 3. In particular, the child process monitors the parent process via polling and the parent process monitors the child process via inter-process communication, namely, the death of child signal. Upon the death of the child, the parent takes corrective action by creating a new child to continue processing. Upon the death of the parent, the child creates a new child to execute the application and the existing child and now parent process monitors the new child.

The process monitoring apparatus and method described above permits efficient process monitoring for applications requiring high-availability and high reliability. The procedures required are readily implemented and are executed expediently for applications that require such availability.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A method for monitoring a software process running on a processor comprising the steps of:

running a first process that executes an application on the processor;

the first process creating a second process to run on the processor, wherein the second process executes the application;

the first process ending execution of the application when the second process is created, wherein the first process receives a signal indicating death of the second process if the second process stops executing;

the second process monitoring the first process to ensure that the first process is still executing;

the second process determining that the first process is no longer executing;

in response to determining the first process is no longer executing, the second process creating a third process to run on the processor, wherein the third process executes the application, wherein the second process receives a signal indicating death of the third process if the third process stops executing; and the second process ending execution of the application when the third process is created.

2. The method of claim 1 wherein the second process polls the first process to ensure that the first process is still executing.

3. The method of claim 1 wherein the second process periodically stores a state information associated with the application.

4. The method of claim 3 wherein the third process uses the state information to execute the application.

5. The method of claim 1 wherein an operating system executing on the processor provides the signal indicating death of the second process and the signal indicating death of the third process.

6. The method of claim 1 wherein the application relates to a wireless communication.

7. An apparatus for monitoring an application comprising:

a first process that executes the application on a processor;

a second process that is created by the first process, wherein the second process executes the application on the processor;

wherein the first process ends execution of the application when the second process is created and the first process receives a signal indicating death of the second process if the second process stops executing;

wherein the second process monitors the first process to ensure that the first process is still executing;

wherein if the second process determines that the first process is no longer executing, the second process creates a third process to run on the processor, wherein the third process executes the application and the second process receives a signal indicating death of the third process if the third process stops executing; and wherein the second process stops executing the application when the third process is created.

8. The apparatus of claim 7 wherein the second process polls the first process to ensure that the first process is still executing.

9. The apparatus of claim 7 wherein the second process periodically stores a state information associated with the application.

10. The apparatus of claim 9 wherein the third process uses the state information to execute the application.

11. The apparatus of claim 7 wherein an operating system executing on the processor provides the signal indicating death of the second process and the signal indicating death of the third process.

12. The apparatus of claim 7 wherein the application relates to a wireless communication.

13. A machine-readable medium having embodied thereon a program, the program being executable by a machine to perform method steps for monitoring a software process on a processor, the method comprising the steps of:

running a first process that executes an application on the processor;

the first process creating a second process to run on the processor, wherein the second process executes the application;

the first process ending execution of the application when the second process is created, wherein the first process receives a signal indicating death of the second process if the second process stops executing;

the second process monitoring the first process to ensure that the first process is still executing;

the second process determining that the first process is no longer executing;

in response to determining the first process is no longer executing, the second process creating a third process to run on the processor, wherein the third process executes the application, wherein the second process receives a signal indicating death of the third process if the third process stops executing; and the second process ending execution of the application when the third process is created.

14. The machine-readable medium of claim 13 wherein the second process polls the first process to ensure that the first process is still executing.

15. The machine-readable medium of claim 13 wherein the second process periodically stores a state information associated with the application.

16. The machine-readable medium of claim 15 wherein the third process uses the state information to execute the application.

17. The machine-readable medium of claim 13 wherein an operating system executing on the processor provides the signal indicating death of the second process and the signal indicating death of the third process.

18. The machine-readable medium of claim 13 wherein the application relates to a wireless communication.

* * * * *